(12) United States Patent
Schmidt

(10) Patent No.: US 9,982,565 B2
(45) Date of Patent: May 29, 2018

(54) DEVICE FOR LUBRICATING A TRANSMISSION AND A BEARING

(75) Inventor: Armin Schmidt, Illingen (DE)

(73) Assignee: HYDAC FILTERTECHNIK GMBH, Sulzbach/Saar (DE)

(*) Notice: Subject to any disclaimer, the term of this patent is extended or adjusted under 35 U.S.C. 154(b) by 753 days.

(21) Appl. No.: 13/261,692

(22) PCT Filed: Dec. 21, 2011

(86) PCT No.: PCT/EP2011/006482
§ 371 (c)(1),
(2), (4) Date: Aug. 19, 2013

(87) PCT Pub. No.: WO2012/095149
PCT Pub. Date: Jul. 19, 2012

(65) Prior Publication Data
US 2013/0336764 A1    Dec. 19, 2013

(30) Foreign Application Priority Data
Jan. 15, 2011   (DE) .................. 10 2011 008 672

(51) Int. Cl.
*F28F 27/00* (2006.01)
*F01D 25/18* (2006.01)
(Continued)

(52) U.S. Cl.
CPC ............... *F01D 25/18* (2013.01); *F01M 5/00* (2013.01); *F03D 80/70* (2016.05); F05B 2260/20 (2013.01); Y02E 10/722 (2013.01)

(58) Field of Classification Search
CPC .......... F01M 5/001; F01M 5/00; F01M 5/002; F01M 5/005; F01D 25/12; F01D 25/18;
(Continued)

(56) References Cited

U.S. PATENT DOCUMENTS 3,759,322 A * 9/1973 Nasser ................. F25J 5/00
165/166
6,536,381 B2 * 3/2003 Langervik ............ F01P 3/20
123/196 AB (Continued)

FOREIGN PATENT DOCUMENTS

DE         102 42 602 A1    3/2004
DE    10 2007 049 599 A1    5/2009
(Continued)

*Primary Examiner* — Mark Laurenzi
*Assistant Examiner* — Anthony Ayala Delgado
(74) *Attorney, Agent, or Firm* — Wenderoth, Lind & Ponack, L.L.P.

(57) ABSTRACT

A device lubricates a transmission (1) and a bearing (1'), in particular a rotor bearing in a wind turbine. The transmission (1) and the bearing (1') are each associated with at least one lubrication circuit (3, 5). A lubricating medium flows in each circuit during the operation of the device. A heat exchanging device (7, 59, 61) transfers heat between the lubrication circuit (3) of the transmission (1) and the lubrication circuit (5) of the bearing (1'). The heat exchanging device (7, 59, 61) at least partially compensates for a difference between the temperature of the lubricating medium in the lubrication circuit (3) of the transmission (1) and the temperature of the lubricating medium in the lubrication circuit (5) of the bearing (1') by heat compensation during the operation of the device.

11 Claims, 5 Drawing Sheets

(51) Int. Cl.
*F01M 5/00* (2006.01)
*F03D 80/70* (2016.01)

(58) Field of Classification Search
CPC .. F01D 25/20; H02K 9/19; F16N 7/40; F16N 39/00; F16N 39/02; F16H 57/0412; F16H 57/0413; F16H 57/0415
USPC ..................................................... 416/170 R
See application file for complete search history.

(56) References Cited

U.S. PATENT DOCUMENTS

| | | | | |
|---|---|---|---|---|
| 8,052,383 | B2* | 11/2011 | Frokjaer | F03D 80/00 415/178 |
| 2005/0034925 | A1* | 2/2005 | Flamang | F03D 11/0008 184/6.12 |
| 2009/0200114 | A1* | 8/2009 | Bagepalli | F03D 11/0008 184/6.22 |
| 2010/0018805 | A1* | 1/2010 | Sachdev | F01M 5/025 184/6.3 |
| 2010/0061853 | A1* | 3/2010 | Bagepalli | H02K 7/1823 416/95 |
| 2010/0164228 | A1 | 7/2010 | Matsuo et al. | |
| 2010/0329869 | A1* | 12/2010 | Okano | F03D 80/70 416/174 |
| 2011/0140444 | A1* | 6/2011 | Winter | F03D 80/00 290/55 |

FOREIGN PATENT DOCUMENTS

| | | | |
|---|---|---|---|
| DE | 10 2009 018 009 A1 | 10/2010 | |
| GB | 2 420 175 A | 5/2006 | |
| JP | 61 025906 | 2/1986 | |
| WO | WO 02095222 A1 * | 11/2002 | ............ F03D 9/002 |

* cited by examiner

DEVICE FOR LUBRICATING A TRANSMISSION AND A BEARING

FIELD OF THE INVENTION

The invention relates to a device for lubricating a transmission, as well as a bearing, in particular a rotor bearing in a wind turbine. The transmission and the rotor bearing are each associated with at least one lubrication circuit of the device. In each circuit, a lubricating medium flows during the operation of the device.

BACKGROUND OF THE INVENTION

In the case of wind turbines, the transmission is lubricated with a lubricating medium, in particular with oil, to adjust the rotor and generator speed. The rotor shaft of the wind turbine rotor is typically mounted with a rotor bearing designed as an anti-friction bearing in a housing of the wind turbine. Lubrication is also provided for this rotor bearing by a lubricating medium, for example in the form of an oil. Because of the different requirements that must be placed on the lubricating media for the transmission and the rotor bearing, such as the viscosity and the optimum operating temperature, independent devices are used for lubrication for each of the two lubrication circuits in known wind turbines.

Since less heat is generated in the rotor bearing compared to the transmission, and cooling is effected by the large surface of the bearing housing, the rotor bearings run at lower operating temperatures, for example in the range of 10° C. to 40° C., while the transmission frequently reaches operating temperatures of 50° C. to 80° C. For technical reasons related to lubrication, lubricating media with a high viscosity are used for the rotor bearing. However, in the case of low ambient temperatures, for example in the winter, the operating temperature of the rotor bearing can drop so low that the lubricating medium, which already has a high viscosity, acquires an even higher viscosity than is useful for the optimum lubrication of the rotor bearing. To counter this higher viscosity in known systems, a heater is provided in the lubrication circuits, for example.

In the case of the transmission, on the other hand, cooling the lubrication medium is often necessary as a result of the high operating temperatures that are reached in the associated lubrication circuit to achieve the most effective possible lubrication of the transmission when the system is in operation.

Both the heating of the lubricating medium for the rotor bearing and the cooling of the lubricating medium for the transmission require devices that use energy, in particular electrical energy, during their operation.

Especially in the case of wind turbines, which from a conceptual point of view are designed to provide electrical energy, they must be designed so that their own energy consumption is kept as low as possible for the wind turbine to achieve the highest possible efficiency.

In the case of known devices for lubricating a transmission as well as a rotor bearing in a wind turbine, the transmission and the bearing are each associated with their own lubrication circuit. In each circuit, a lubricating medium flows when the device is in operation.

SUMMARY OF THE INVENTION

Starting from this prior art, the object of the invention is to provide an improved device for lubricating a transmission as well as a bearing, in particular a rotor bearing in a wind turbine, wherein the device ensures a reliable lubrication of the transmission and of the rotor bearing, with reduced energy consumption for operating the device even at low ambient temperatures.

In the case of the device according to the invention for lubricating a transmission as well as a bearing, in particular a rotor bearing in a wind turbine, because the device has a heat exchanging device for heat transfer between the lubrication circuit of the transmission and the lubrication circuit of the bearing, and because the heat exchanging device at least partially equalizes a difference between the temperature of the lubricating medium in the lubrication circuit of the transmission and the temperature of the lubricating medium in the lubrication circuit of the bearing, through heat compensation when the device is in operation, heat can be transferred from the lubrication circuit associated with the transmission to the lubrication circuit associated with the rotor bearing when the device is in operation. In this way, the lubricating medium of the lubrication circuit of the rotor bearing assumes a more favorable temperature for the lubrication, in particular a higher temperature, even at low ambient temperatures. At the same time, due to the removal of heat from the lubricating medium of the lubrication circuit of the transmission, the lubricating medium can operate in the transmission at a temperature in a range that is beneficial for lubrication, in particular at a temperature range that is not too high. The solution according to the invention is very energy-efficient, since the unwanted heat in the lubrication circuit of the transmission is used for the desired heating of the lubricating medium in the lubrication circuit of the rotor bearing. Conversely, heat equalization at high temperatures is also possible when the hot transmission of the wind turbine is cooled via the rotor bearing-lubrication circuit.

In an embodiment of the invention, the heat exchanging device has a heat exchanger with a separator, preferably a partition for separating a first region of the heat exchanger disposed on a first side of the heat exchanger from a second region of the heat exchanger disposed on a second side of the separator. The separator then provides thermal coupling between the first region. One of the lubricating media can be passed through in the first region and comes into contact with the separator on its first side for the purpose of heat transfer. Through the heat transfer from one of the lubricating media to the separator of the heat exchanger, heat can be transferred from the lubricating medium to the separator, or vice versa.

In an embodiment of the invention, the other lubricating medium can be passed through the second region and comes into contact with the separator on its second side for the purpose of heat transfer. A heat transfer is then from the separator to the other lubricating medium, and a heat transmission through the separator is established. The heat transmission that is established thereby allows a heat transfer between the two lubricating media, which are nonetheless separated from one another in a fluid-tight manner by the heat exchanger.

In an embodiment of the invention, the other lubricating medium that comes into contact with the second side of the separator of the heat exchanger is connected with the associated lubrication circuit. Then, fluid is conducted, and in particular, the other lubricating medium flowing in the associated lubrication circuit is conducted completely through the heat exchanger. If the other lubrication circuit is associated with the transmission, the heat generated in the transmission when it is in operation is at least partially transferred to the other lubricating medium as a result. The heat can be used via the heat exchanger, for example to heat the lubricating medium of the rotor bearing.

In an embodiment of the invention, the separator of the heat exchanger comes into contact with a heat transfer medium from the second side, in particular a water-glycol mixture. A heat transfer from the separator to the heat transfer medium and a heat transmission through the separator is then established. Choosing a suitable heat transfer medium allows for the most effective possible heat transfer and in particular the viscosity, if a separate heat transfer medium can be selected independently of the requirements for the viscosity of the lubricating media.

In an embodiment of the invention, the heat transfer device has a further heat exchanger. The further heat exchanger comes into contact with the heat transfer medium on a first side of its separator and comes into contact with the other lubricating medium as a further heat transfer fluid on a second side of its separator. The heat transfer medium then makes a heat transfer between the two lubricating media possible, but is separated from these media in a fluid-tight manner.

In an embodiment of the invention, the heat transfer device has a pump for the forced passage of one of the lubricating media or of the heat transfer medium through the heat exchanger.

Alternatively, the heat transfer device can also have a heat pipe. The heat pipe has a thermal coupling at one end with one lubrication circuit, and at the other end with the other lubrication circuit. The heat transfer through the heat pipe is realized in a known manner via the evaporation of a liquid having a low boiling temperature at the warmer end of the heat pipe. The evaporated liquid is condensed again at the other, cooler end. The return transport of the liquid to the warmer end is done via the capillary action of a porous coating on the inside of the heat pipe.

In an embodiment of the invention, the heat exchanger is designed as a plate-bundle exchanger or tube-bundle exchanger.

In an embodiment of the invention, the heat transfer between the lubrication circuit associated with the transmission and the lubrication circuit associated with the rotor bearing is improved by a locally close proximity of the two lubrication circuits and/or by a high thermal conductivity of a housing of the wind turbine that accommodates the device. A cost-effective support of the heat transfer between the two lubrication circuits is realized through the relevant structural design.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
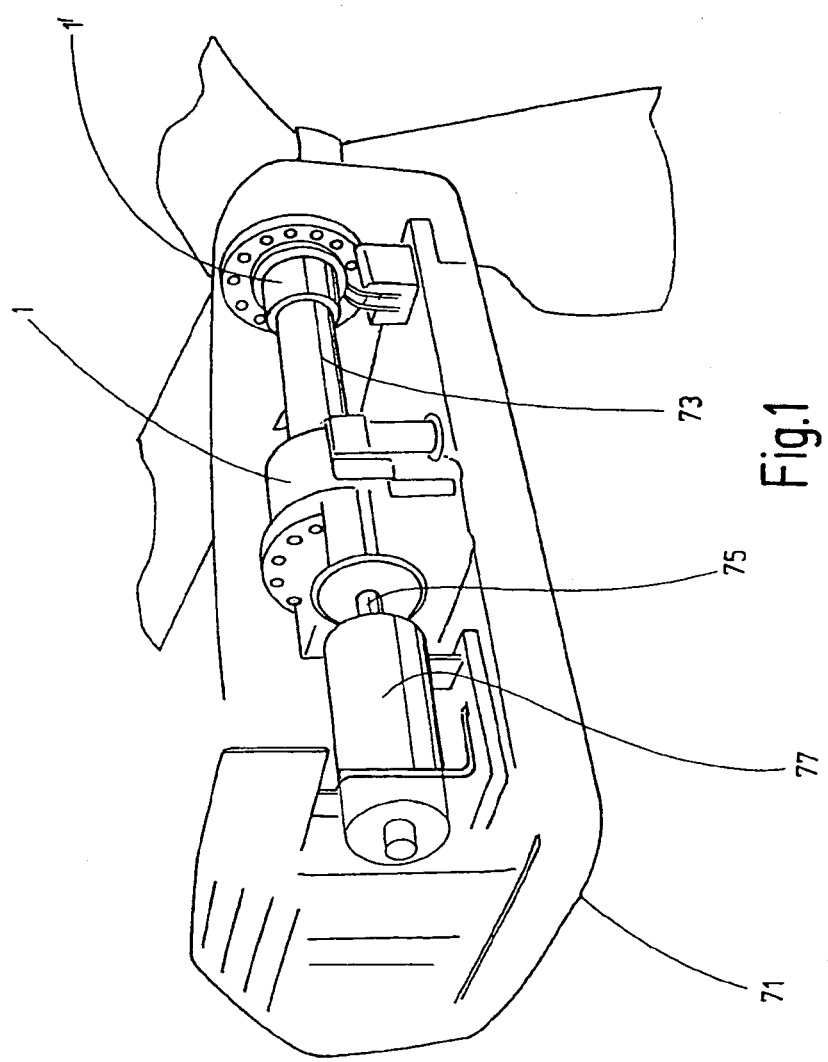
FIG. 1 is a simplified perspective view of the inside of the housing of a wind turbine.

FIG. 1 shows a simplified perspective view of the inside of the housing 71 (also: equipment pod, gondola or nacelle) of a wind turbine. The rotor of the wind turbine at the right edge of the image of FIG. 1 is coupled to the transmission 1 via a first shaft 73, i.e., the rotor shaft. The rotor shaft 73 is mounted in a rotor bearing 1' (also: main bearing), preferably designed as an anti-friction bearing. The transmission 1, in turn, is coupled to the generator 77 via a second shaft 75 of the wind turbine. A rotational motion of the rotor (not numbered) is transferred via the first shaft 73 to the transmission 1, which converts the relatively low rotational speed of the rotor into a higher rotational speed needed to operate the generator 77, and which drives the generator 77 via the second shaft 75 at the increased rotational speed.

The transmission 1 and the rotor bearing 1' are each associated with a lubrication circuit 3 or 5 (see FIGS. 2 to 4) of the device according to the invention.

FIGS. 2, 3a-3b and 4 show the device according to the invention for lubricating the transmission 1 (see FIG. 1) as well as the bearing 1' (see FIG. 1), each in an example of a device for lubricating a transmission 1 as well as a rotor bearing 1' in a wind turbine. The transmission 1 and the bearing 1' are each associated with at least one lubrication circuit 3 and 5 of the device, in each circuit of which a lubricating medium flows during the operation of the device.

Figure 2:
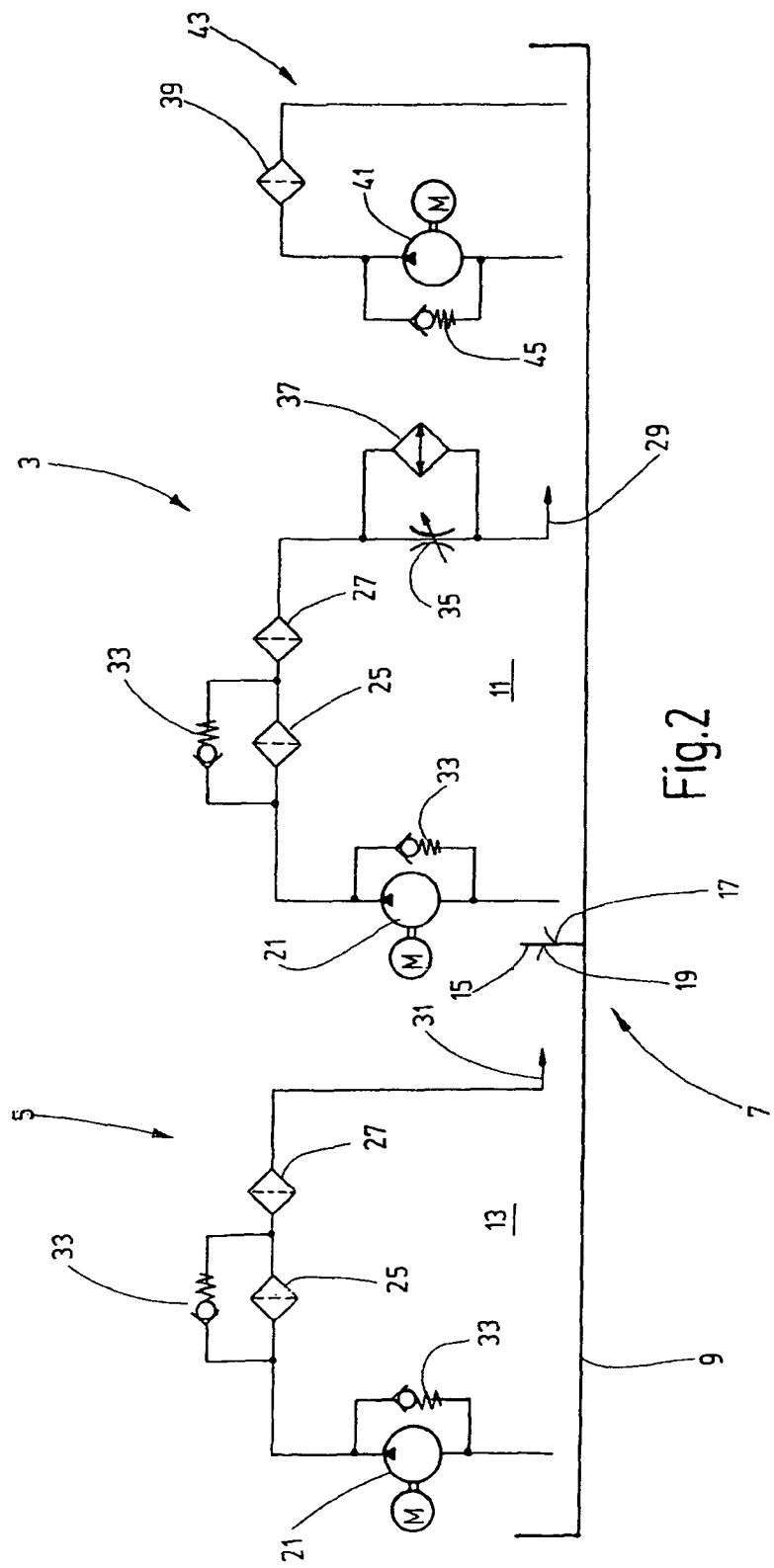
FIG. 2 is a schematic diagram of a device according to a first exemplary embodiment of the invention.

According to FIG. 2, the device has a heat exchanging device 7 for heat transfer between the lubrication circuit 3 of the transmission 1 and the lubrication circuit 5 of the bearing 1'. The heat exchanging device 7 has a tank 9 for receiving the lubricating media, wherein the tank is subdivided by a separator 15 into a first region 11 and a second region 13. A lubricating medium for the lubrication circuit 3 of the transmission 1 can be received in the first region 1, while a lubricating medium for the lubrication circuit 5 of the rotor bearing 1' can be received in the second region 13. The relevant separator 15 of the heat exchanging device 7 preferably extends perpendicular to the bottom of the tank 9 and subdivides this tank into the two regions 11 and 13.

In the embodiment shown, the separator 15 is preferably realized as the type of partition that effectively prevents an overflow of the lubricating medium received in the first region 11 into the second region 13 and vice versa. The lubricating medium that can be passed through the first region 11 comes into contact with the partition 15 on its first side 17, while the lubricating medium that can be passed through the second region 13 comes into contact with the partition 15 on its second side 19. Heat equalization or heat compensation for a difference of temperature of the lubricating medium in the region 11 to the temperature of the lubricating medium in the region 13 of the heat exchanging device 7 is realized through a heat transmission through the partition 15. During the operation of a wind turbine, the one lubricating medium circulating in the lubrication circuit 3 of the transmission 1 takes on a higher temperature during normal operation than the lubricating medium of the lubrication circuit 5 of the rotor bearing 1' circulating in the second region 13. This temperature difference stems from the fact that the transmission 1 of a wind turbine creates a gear ratio from a very low to a very high rotational speeds and that substantial heat loss occurs as a result of the friction that arises, for example in gears of the transmission 1, which gears are in fluid communication with the lubricating medium. In contrast, the heating of the lubricating medium in the lubrication circuit 5 of the rotor bearing 1' is, as a rule, substantially lower as a result of the relatively low rotational speed of the wind turbine rotor and the shaft 73 connected thereto (see FIG. 1).

In the case of the embodiment according to FIG. 2, a heat transfer to equalize a difference between the temperature of the lubricating medium in the lubrication circuit 3 of the transmission 1 and the temperature of the lubricating medium in the lubrication circuit 5 of the bearing 1' takes place as a result of a heat transmission through the partition 15. A heat transfer first is from the one lubricating medium in the first region 11 to the first side 17 of the partition 15, then heat conduction through the partition 15 and finally a renewed heat transfer from the second side 19 of the partition 15 to the other lubricating medium flowing in the second region 13. As a result, on the one hand, a heating of the lubricating medium for the lubrication circuit 5 of the rotor bearing 1' can be achieved, and on the other hand, a cooling of the lubricating medium for the lubrication circuit 3 of the transmission 1 can be achieved.

The lubrication circuits 3 and 5 respectively are each connected in the conventional manner to the associated region 11 or 13 of the tank 9 via a pump 21. The respective lubricating medium reaches the transmission 1 (see FIG. 1) or to the rotor bearing 1' (see FIG. 1) via one or more filter units 25, 27 by a connection device 29, 31. The pump 21 as well as one or more of the filter units 25, 27 can each be bypassed via an associated check valve 33. Furthermore, the lubrication circuit 3 of the transmission 1 has a cooling device 37 and a thermal bypass valve 35 connected parallel thereto. Supported by the cooling device 37, the lubricating medium of the transmission 1 can be cooled to a favorable operating temperature. The filter 25 can be bypassed using the check valve 33, which is connected in parallel, so that a transport of the lubricating medium can be guaranteed even if the filter 25 is partially or completely contaminated. A filter grade of approximately 10 µm is used for the filter 25, while for filter 27, a filter grade of approximately 50 µm is preferably used.

Shown on the right of FIG. 2, an additional filter unit 43 is disposed separately from the actual lubrication circuit 3 as an "offline filter unit". Filter unit 43 has a filter 39, which has a filter grade of approximately 5 µm to perform additional cleaning of the lubricating medium for the lubricating circuit 3 of the transmission 1. The relevant offline filter unit 43 is provided with lubricating medium from the region 11 of the tank 9 via a pump 41, parallel to which a check valve 45 is disposed, and carries the lubricating medium back to region 11 after it has been cleaned. Such an additional filter unit 43 is advantageous, in particular to achieve a longer service life in offshore wind turbines.

Figure 3A:
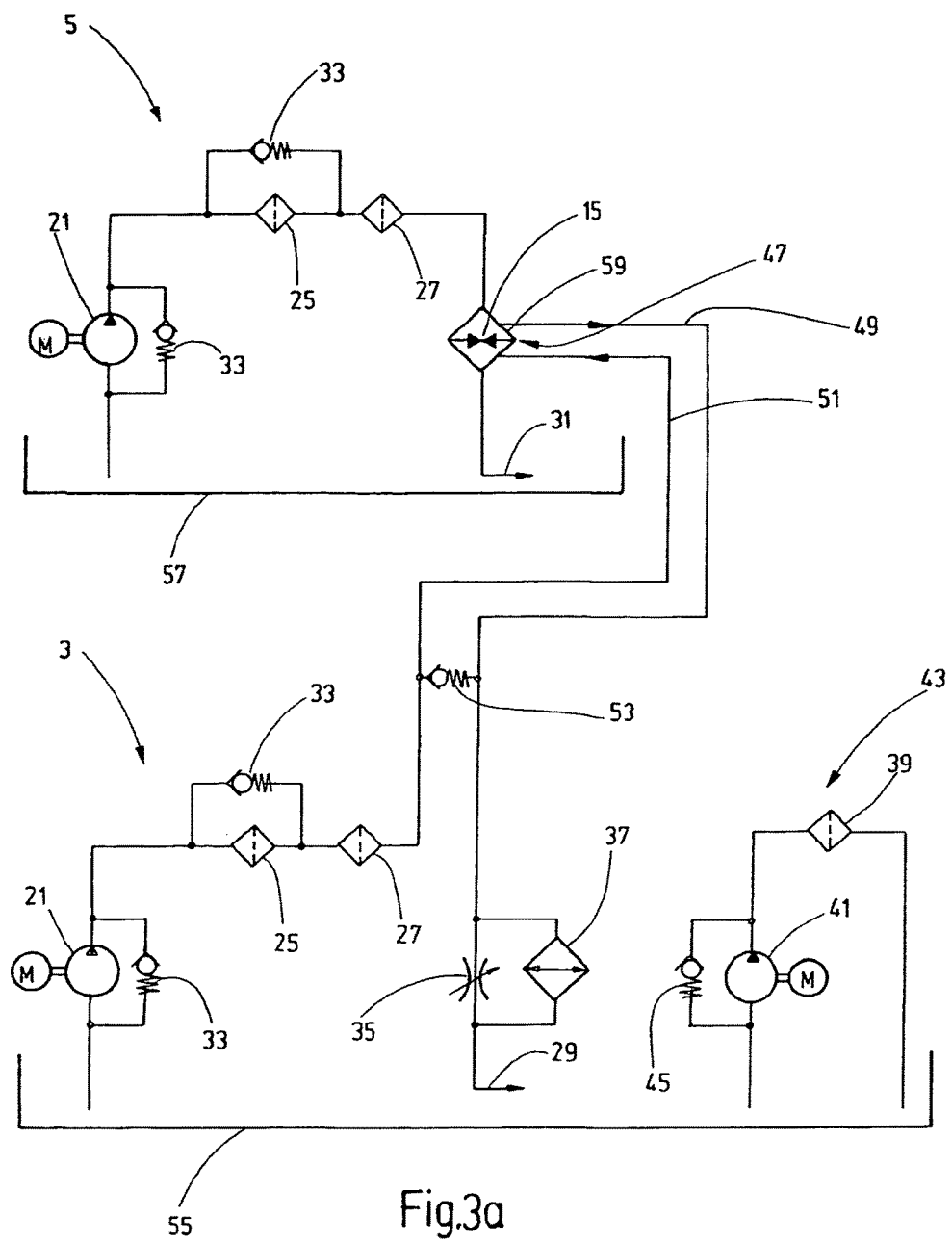
FIG. 3a is a schematic diagram of a device according to a second exemplary embodiment of the invention.

In the case of the embodiment according to FIG. 3a, a first tank 55 is provided for one lubricating medium of the lubrication circuit 3 of the transmission 1 (see FIG. 1) is provided. A second tank 57, separate from the first tank, is provided for the lubricating medium for the lubrication circuit 5 of the rotor bearing 1' (see FIG. 1). The first tank 55 can also be formed by a gearbox that accommodates the lubricating medium for the transmission 1, resulting in a particularly space-saving and material-saving design of the heat exchanging device. In doing so, the second tank 57 can be disposed on the gearbox of the transmission 1, wherein the gearbox can form the separator 15 in this respect. Apart from design of the heat exchanging device 47, which differs from that of the heat exchanging device 7 shown in FIG. 2, the components lubrication circuits 3, 5 as well as the offline filter 43 do not differ from those shown in FIG. 2, so that a repeated explanation of these details is omitted here.

The heat exchanging device 47, which can have a heat exchanger in the form of a plate bundle reservoir or a tube bundle reservoir, for example, is provided with a lubricating medium of the lubrication circuit 3 of the transmission 1 on a first side via lines 49 and 51 that are connected to the lubrication circuit 3 of the transmission 1. The lubricating medium flows to a first side (not shown) of the separator 15 of the heat exchanger 59 of the heat exchanging device 47. In so doing, the connection lines 49 and 51 can be bypassed via a check valve 53. If excess pressure arises at the influx of one lubricating medium via the line 51 to the heat exchanger 59, the lubricating medium can pass directly to the line 49 via the check valve 53, bypassing the heat exchanger 59, and thus, be supplied directly to the cooling device 37 or the thermal bypass valve 35. In this way, a continuous lubrication of the transmission 1 can be guaranteed even in this case. On the second side (not shown) of the separator 15 of the heat exchanger 59, the other lubricating medium of the lubrication circuit 5 of the rotor bearing 1' flows to this side of the separator. In this way, temperature equalization is achieved between the two lubricating media.

Figure 3B:
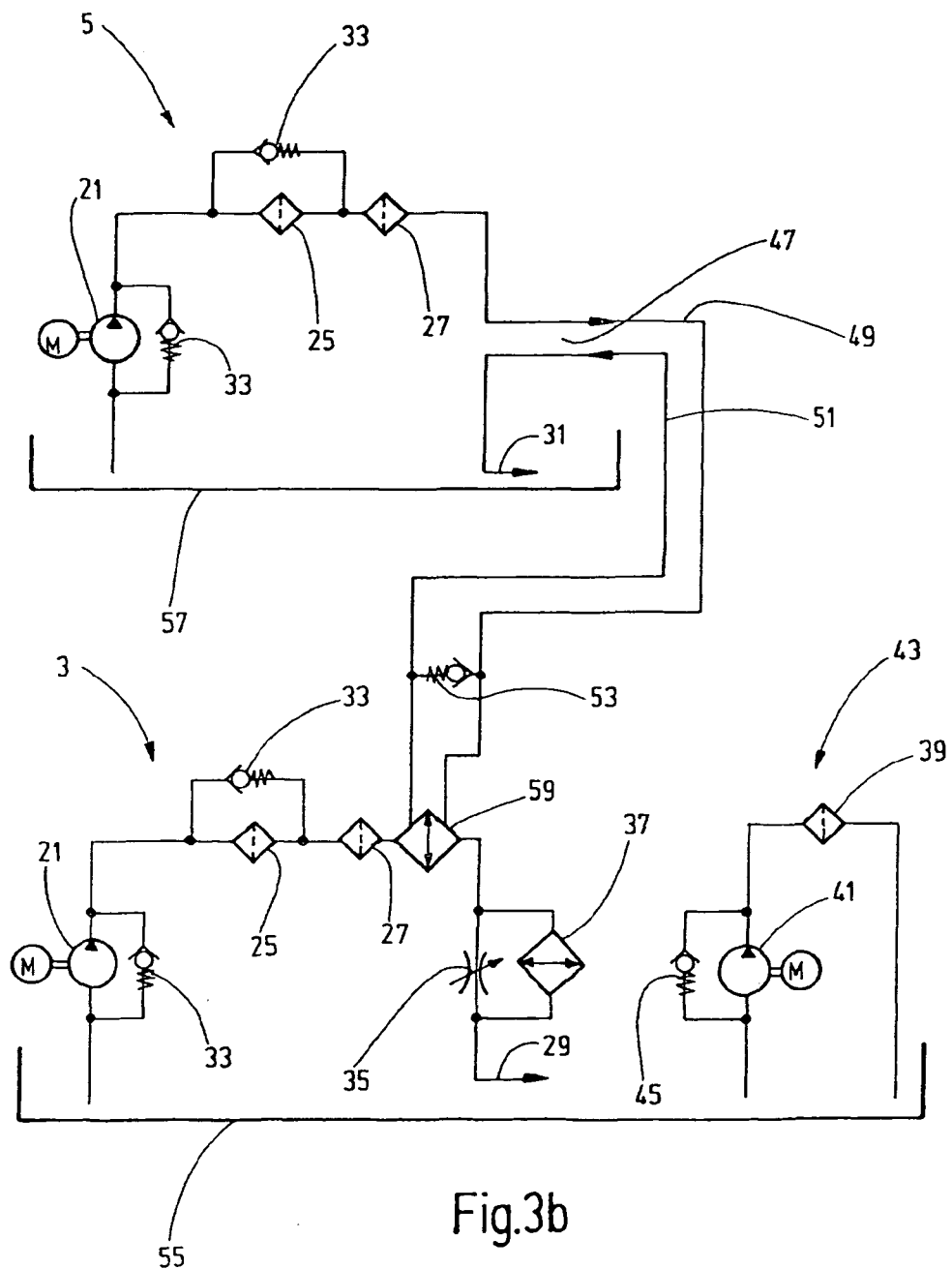
FIG. 3b is a schematic diagram of a device according to a third exemplary embodiment of the invention.

In the case of the embodiment according to FIG. 3b, the heat exchanger 59 is associated with the lubrication circuit 3 of the transmission 1, and the lubricating medium of the lubrication circuit 3 of the transmission 1 flows to the heat exchanger 59. Correspondingly, the arrangement of the check valve 53 between the connection lines 49 and 51 is such that an overflow from the connection line 49 to the connection line 51 is possible via the check valve 53.

Figure 4:
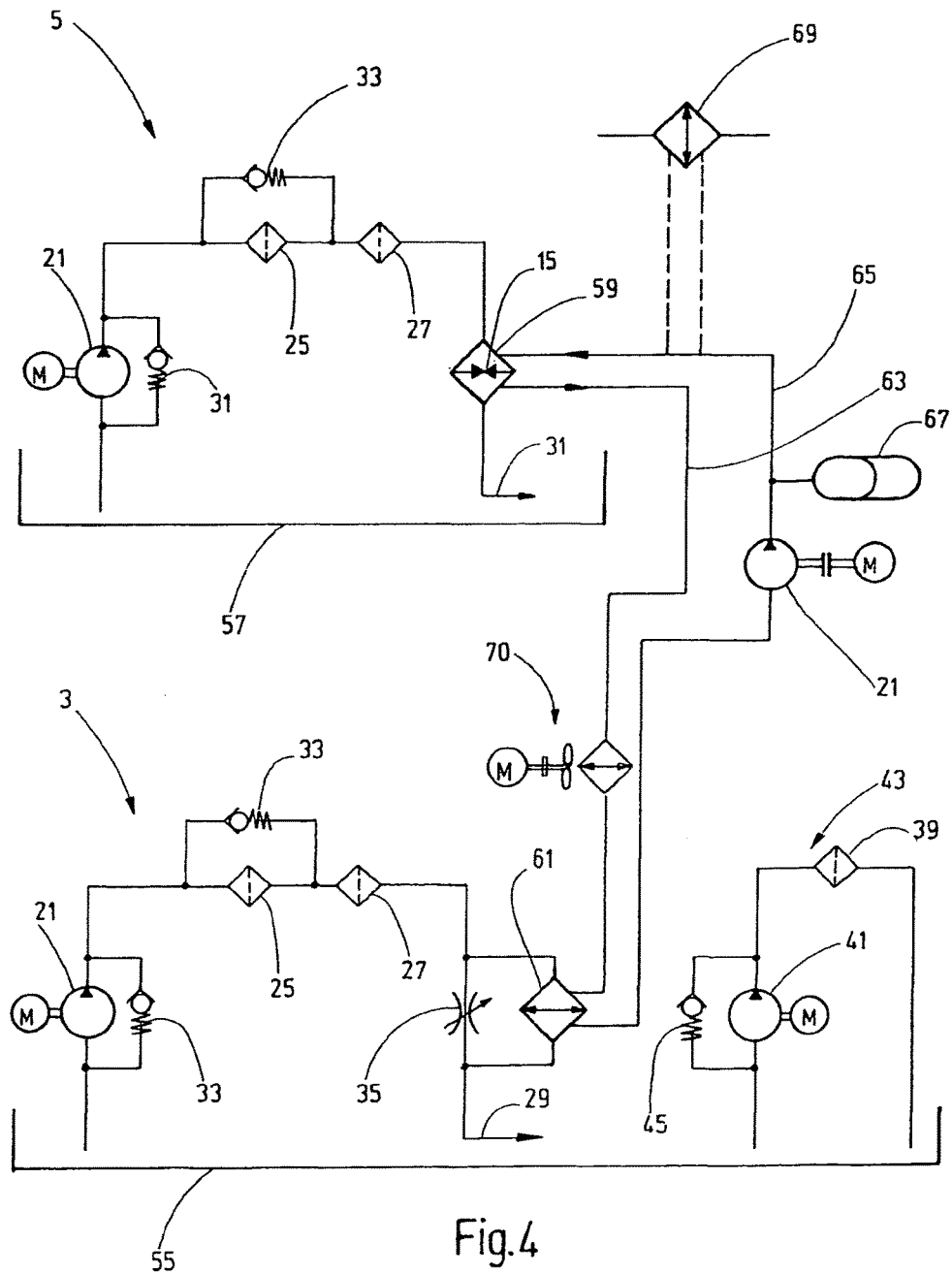
FIG. 4 is a schematic diagram of a device according to a fourth exemplary embodiment of the invention.

In the case of the embodiment according to FIG. 4, in addition to the heat exchanger 59, a further heat exchanger 61 is provided and is connected to the heat exchanger 59 via a pump 21 as well as lines 63 and 65. The heat exchanger 59 is perfused on its first side by the lubricating medium of the lubrication circuit 5 of the rotor bearing 1' (see FIG. 1), while the heat exchanger 61 is perfused on its first side by the lubricating medium of the lubrication circuit 3 of the transmission 1 (see FIG. 1). A thermal coupling is created between the two heat exchangers 59 and 61 on their respective second side, by a heat transfer medium that is separated from the lubricating media, for example in the form of a water-glycol mixture.

A heat transfer from the lubrication circuit 3 of the transmission 1 to the lubrication circuit 5 of the rotor 1' is then realized. The heat transfer medium is conveyed to the first side of the heat exchanger 59 by the pump 21. An equalizing tank 67 is disposed on the line 65 at the outlet of the pump 21 to prevent pressure surges of the heat transfer medium.

FIG. 4 only shows a sketch of an optional further heat exchanger 69 that likewise can be perfused by the heat transfer medium, via which further components of the wind turbine, such as a generator, an inverter and additional components of the power supply equipment and power electronics (not shown) can be cooled. The heat exchanger 69 can be connected to a separation line (not shown) in the line 65, for example, via the lines shown as dashed lines, so that the heat transfer medium flowing in the line 65 is also carried through the further heat exchanger 69.

Moreover, in particular an additional cooling device 70, also with a thermal bypass valve connected in parallel, can be inserted in the line 63, so that supportive cooling of the heat transfer medium is made possible.

An improved thermal coupling of the two lubrication circuits 3 and 5 can be achieved in all of the embodiments shown by designing the tanks 55, 57 (FIGS. 3a, 3b and 4) or the two regions 11 and 13 of the tank 9 (FIG. 2) provided for holding the lubricant as a kind of "tank within a tank" solution. Thus for example, the tank 55 can be disposed inside the tank 57 (FIGS. 3a, 3b and 4), so that extensive heat transmission from the lubricating medium of the transmission 1 to the lubricating medium of the rotor bearing 1' is made possible via the walls of the tank 55.

In the case of the embodiment according to FIG. 2, on the one hand, the separator 15 that is designed as a partition can be can be shaped to provide its own mechanical stabilization. On the other hand, it can be shaped having an uneven, in particular a ribbed or otherwise modulated, structure to increase the heat transmission. An improved heat transmission is realized by the partition as a result of the increased surface of the relevant partition.

Moreover, all embodiments can be equipped with further components such as separators for the removal of air and/or water from the oil, as well as separators for the removal of oil sludge or substances that develop as oil ages.

While various embodiments have been chosen to illustrate the invention, it will be understood by those skilled in the art that various changes and modifications can be made therein without departing from the scope of the invention as defined in the claims.

The invention claimed is:

1. A device for lubricating a transmission and a bearing, the device comprising:
   a transmission lubrication circuit being connected to the transmission and having a transmission lubricating medium flowing in said transmission and in said transmission lubrication circuit;
   a bearing lubrication circuit being connected to the bearing and having a bearing lubricating medium flowing in said bearing and in said bearing lubrication circuit; and
   transmission and bearing heat exchangers being connected in fluid communication with said transmission and bearing lubrication circuits, respectively, connecting lines extending between and connecting said transmission and bearing heat exchangers in fluid communication, conveying a heat exchange medium between said transmission and bearing heat exchangers and transferring heat between said transmission and bearing lubrication mediums during device operation, a difference between a temperature of said transmission lubricating medium and a temperature of said bearing lubricating medium being at least partially compensated through heat equalization of said lubricating mediums, said connecting lines forming a closed heat exchange circuit with said heat exchangers, said heat exchange circuit being separate from and being independent of said transmission lubrication circuit and said bearing lubrication circuit.

2. A device according to claim 1 wherein
said transmission and bearing lubricating mediums flow completely through said transmission and bearing heat exchangers separately and independently of one another.

3. A device according to claim 1 wherein
said heat exchange medium comprises a water-glycol mixture.

4. A device according to claim 1 wherein
a pump is in one of said connecting lines, is in fluid communication with one of said heat exchangers and conveys said heat exchange medium through the respective heat exchanger under pressure.

5. A device according to claim 1 wherein
a pump is in each of said connecting lines, is in fluid communication with each said heat exchanger and conveys said heat exchange medium through each said heat exchanger under pressure.

6. A device according to claim 1 wherein
each said heat exchanger is a plate bundle exchanger.

7. A device according to claim 1 wherein
each said heat exchanger is a tube bundle exchanger.

8. A device according to claim 1 wherein
said transmission lubrication circuit and said bearing lubrication circuit are in close proximity to improve hear transfer therebetween.

9. A device according to claim 1 wherein
said lubrication circuits are in a housing with high thermal conductivity of a wind turbine.

10. A device according to claim 1 wherein
said transmission lubrication circuit and said bearing lubrication circuit are separate with the transmission lubricating medium maintained separate from said bearing lubricating medium.

11. A device according to claim 1 wherein
said heat exchange medium is a liquid.

* * * * *